Sept. 1, 1942.  G. S. FRASER  2,294,742
WHARVE DRIVEN FLYER SPINDLE
Filed March 26, 1942  2 Sheets-Sheet 1

Inventor
Gordon Scott Fraser
By
Pennie, Davis, Marvin & Edmonds
Attorneys

Sept. 1, 1942.　　　G. S. FRASER　　　2,294,742

WHARVE DRIVEN FLYER SPINDLE

Filed March 26, 1942　　　2 Sheets-Sheet 2

Patented Sept. 1, 1942

2,294,742

UNITED STATES PATENT OFFICE 2,294,742

WHARVE DRIVEN FLYER SPINDLE

Gordon Scott Fraser, Arbroath, Scotland, assignor to Douglas Fraser & Sons Limited, Arbroath, Angus, Scotland, a corporation of Great Britain Application March 26, 1942, Serial No. 436,235
In Great Britain March 28, 1941

6 Claims. (Cl. 57—115)

This invention relates to improvements in wharve-driven flyer spindles for machines for use in the manufacture of rove and yarn from jute and like fibres, and more particularly to a flyer spindle unit of the type including a vertical hollow flyer spindle carrying at its lower end a suspended flyer and carrying on its upper part a driving wharve, a housing within which the spindle is journalled in upper and lower anti-friction bearings, each of said bearings including an inner race embracing the spindle and an outer race supported by the housing, and a lubricant sump within the lower part of the housing from which liquid lubricant is conducted to the bearings.

The present invention consists of a wharve-driven flyer spindle unit of the type referred to in which the circumferential wall of the lubricant sump is disposed eccentrically to the spindle, and a rotor member carried by and coaxial with the spindle and dipping into the lubricant in the sump is adapted frictionally to sweep lubricant into a convergent passage formed between a segment of the circumferential wall of the sump and the periphery of the rotor member and communicating with a duct through which the lubricant flows to the upper bearing.

The duct is conveniently drilled in the lateral wall of the housing close to the bearing-accommodating bore of the housing, the lubricant being led from the duct by way of a port into the lower end of the upper bearing, or by way of a port into the upper end of the upper bearing. The oil drains from the upper bearing, passes downwardly by gravity through an annular space between the bore of the housing and the exterior of a tubular distance piece surrounding the spindle and interposed endwise between the inner races of the bearings, and flows through the lower bearing back into the sump.

The rotor member may be constituted by a thimble of inverted cup shape strung on the lower portion of the spindle, the skirt of the rotor member being partially immersed in the lubricant in the sump.

The sump may be formed within an integral base part of the housing, or, alternatively, the sump may be provided by an annular plug detachably fitted to the base of the housing.

Figure 1:
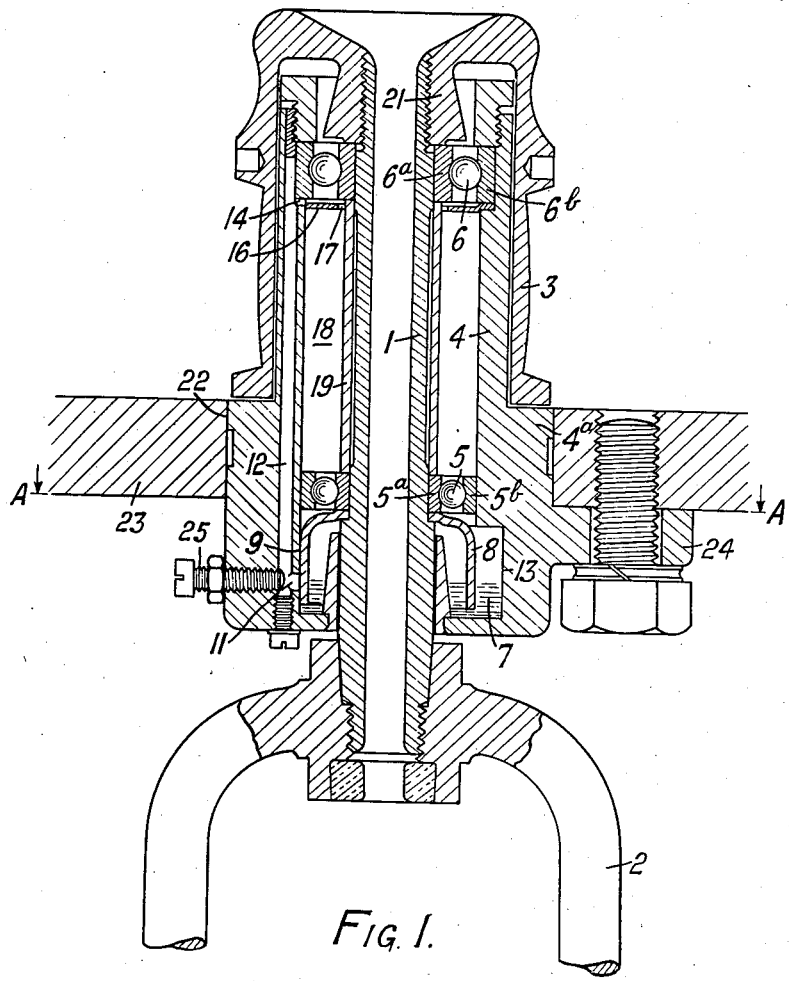
Figure 2:
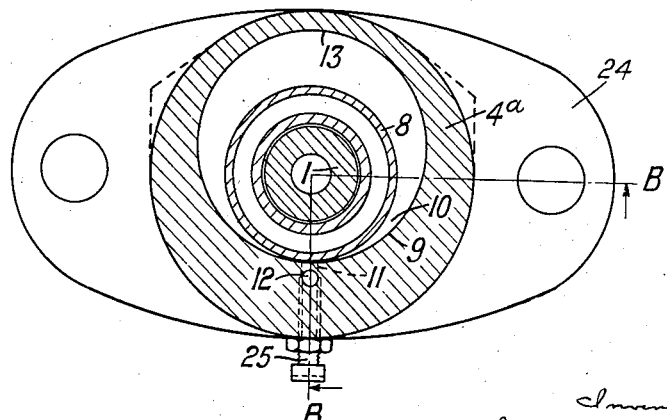
Figure 3:
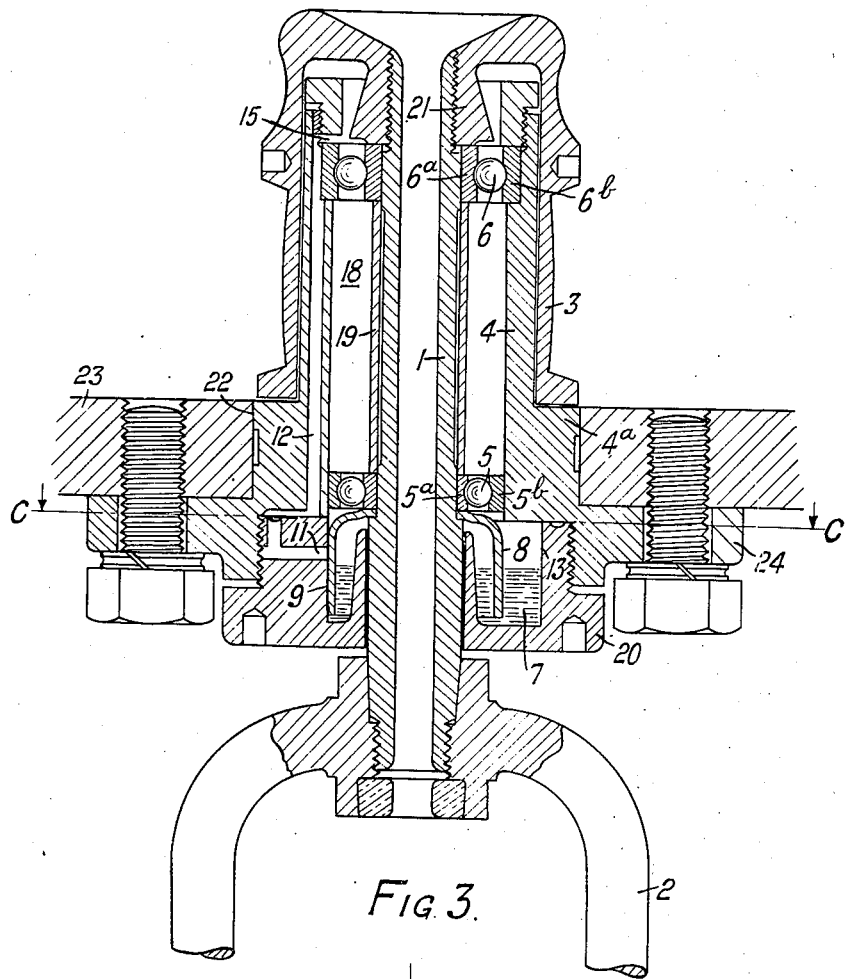
Figure 4:
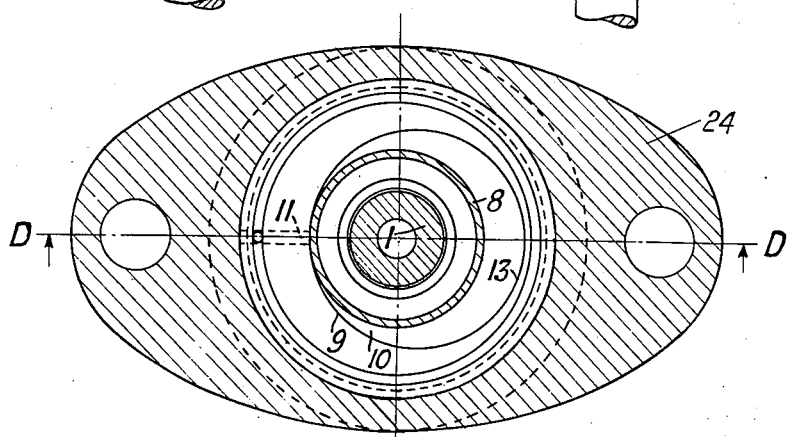

The invention is illustrated in the accompanying drawings in which Fig. 1 is a vertical axial section on the line B—B of Fig. 2, and Fig. 2 a horizontal section substantially on the line A—A of Fig. 1, showing one embodiment of wharve-driven flyer spindle according to the invention. Fig. 3 is a vertical axial section on the line D—D of Fig. 4, and Fig. 4 is a horizontal section substantially on the line C—C of Fig. 3, showing a modified embodiment of wharve-driven flyer spindle according to the invention.

Referring to the drawings, each of the wharve-driven flyer spindle constructions shown includes a vertical hollow flyer spindle 1 carrying at its lower end a suspended flyer 2 and carrying on its upper part a driving wharve 3, a housing 4 within which the spindle 1 is journalled in a lower anti-friction bearing 5 and in an upper anti-friction bearing 6, each of said bearings including an inner race $5^a$ or $6^a$ embracing the spindle 1 and an outer race $5^b$ or $6^b$ supported by the housing 4, and a lubricant sump 7 within the lower part of the housing 4 from which liquid lubricant, e. g., oil, is fed to the bearings.

8 denotes a hollow rotor member carried by the spindle 1 and having a cylindrical wall depending into the lubricant within the sump 7. 9 denotes a lateral wall portion of the sump 7 forming with the cylindrical wall of the rotor member 8 a wedge-shaped lubricant passage 10 which converges, in the direction of rotation of the rotor member, towards a lubricant outlet port 11 located close to the cylindrical wall of the rotor member 8 and communicating with a lubricant duct 12 leading to the upper bearing 6, the construction being such that the rotor member frictionally sweeps or pumps lubricant into and builds up lubricant pressure within the passage 10 whereby the lubricant is fed through the port 11 and upwardly through the duct 12 to the upper bearing 6.

The lateral wall portion 9 of the sump 7 is constituted by a segment of a cylindrical wall 13 forming the circumferential boundary of the sump 7, surrounding the spindle 1, and so arranged eccentrically with reference to the axis of the spindle 1 that said segment and the circumference of the rotor member 8 contact, or almost contact, with one another at a point in register with the outlet port 11.

The duct 12 is drilled in the lateral wall of the housing 4 close to the bearing-accommodating bore of the housing. As shown in Figs. 1 and 2, the lubricant is led from the duct 12 by way of a port 14 into the lower end of the bearing 6. Alternatively, and as shown in Figs. 3 and 4, the lubricant may be led from the duct 12 into the upper end of the bearing 6 by way of a port 15. In the first arrangement there is arranged below the bearing 6 an annular sealing disc 16 carried by the housing 4 and affording a return port 17, In both arrangements the lubricant drains from the bearing 6, passes downwardly by gravity through an annular space 18 between the bore of the housing 4 and the exterior of a tubular distance piece 19 surrounding the spindle and interposed endwise between the inner races 5ª, 6ª of the bearings, and flows through the bearing 5 back into the sump 7, the arrangement thus providing a simple circulating system for the lubricant.

The rotor member 8 is constituted by a thimble of inverted cup shape strung on the lower portion of the spindle 1 and having a skirt portion immersed in the lubricant.

As shown in Figs. 1 and 2, the sump 7 is formed within an integral base part of the housing 4. Alternatively, and as shown in Figs. 3 and 4, the sump 7 is provided by an annular plug 20 screw-threaded into the base of the housing 4.

25 (Figs. 1 and 2) denotes an adjustable obturator screw adapted to permit regulation of the rate of flow of lubricant through the port 11 into the duct 12.

The wharve 3 proper is in the form of a sleeve closely surrounding the housing 4 and formed integral at its upper end with a depending central boss 21 which is in screw-threaded engagement with the upper end portion of the spindle 1.

The housing 4 is adapted to be mounted in an opening 22 in a rail 23, a portion 4ª of the housing near the lower end thereof serving as a spigot engaging the opening 22. An external flange 24 on the housing is bolted to the underside of the rail 23.

As will be understood, a wharve-driven flyer spindle constructed as described constitutes a self-contained unit which may be removed from and replaced in position on the rail 23 without removal of any part of the unit other than the bolts which fasten the flange 24 to the rail 23.

I claim:

1. A wharve-driven flyer spindle unit comprising a hollow vertical spindle, a flyer suspended from the lower end of said spindle, a driving wharve on the upper part of said spindle, a housing for said spindle, upper and lower spindle bearings within said housing, a lubricant sump at the base of said housing, said sump having a circumferential wall disposed eccentrically to said spindle and formed with a port, a rotor member carried by and coaxial with said spindle, said rotor member presenting one lateral boundary of a convergent passage leading to said port, a segment of said circumferential wall forming the other lateral boundary of said passage, and a duct leading from said port to said upper bearing, said rotor member dipping into the lubricant in said sump and adapted frictionally to sweep lubricant into said passage to flow through said port and through said duct to said upper bearing.

2. A wharve-driven flyer spindle unit as claimed in claim 1 having means for regulating the flow of lubricant to the upper bearing.

3. A wharve-driven flyer spindle unit as claimed in claim 1 in which the rotor member is constituted by a thimble of inverted cup shape strung on the lower portion of the spindle and having a skirt portion partially immersed in the lubricant in the sump.

4. A wharve-driven flyer spindle unit as claimed in claim 1 in which the sump is formed within an integral base part of the spindle housing.

5. A wharve-driven flyer spindle unit as claimed in claim 1 in which the sump is provided by an annular plug detachably fitted to the base of the spindle housing.

6. A wharve-driven flyer spindle unit as claimed in claim 1 in which the lubricant duct is drilled in the lateral wall of the spindle housing.

GORDON SCOTT FRASER.